Sept. 26, 1961     T. J. WEBSTER     3,001,376
STORAGE TANKS FOR LIQUID OXYGEN AND THE LIKE IN ROCKETS
Filed Nov. 20, 1958
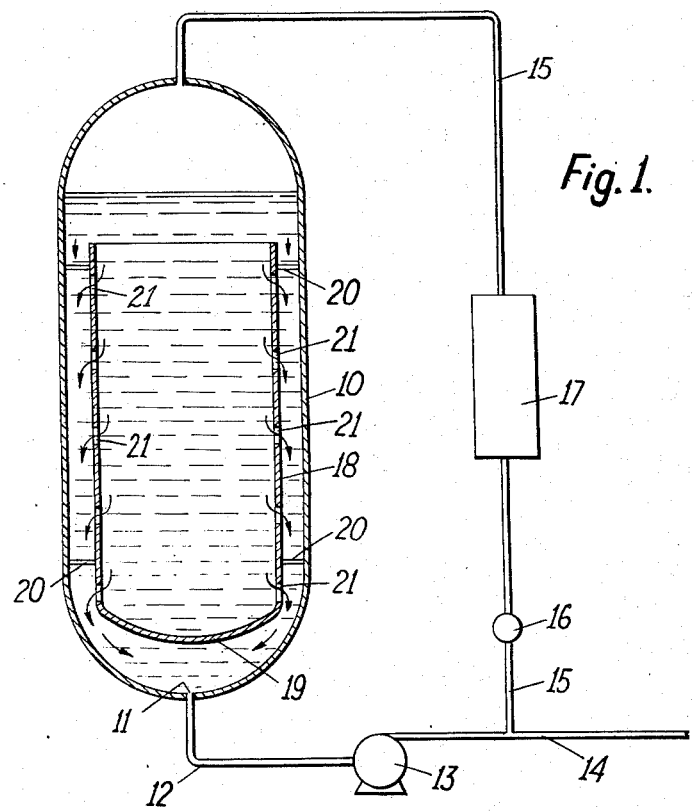
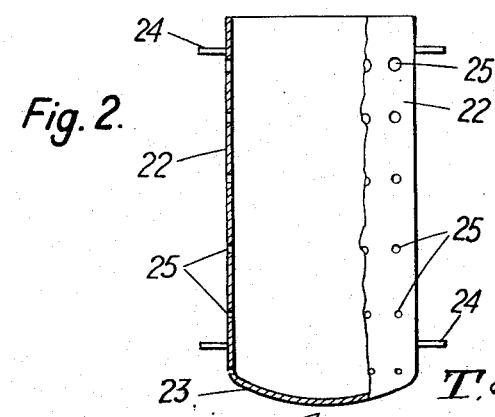
Inventor
T. J. Webster
By
Glascock Downing Leebold
Attorneys 3,001,376
STORAGE TANKS FOR LIQUID OXYGEN AND
THE LIKE IN ROCKETS
Thomas John Webster, Ashford, England, assignor to
The British Oxygen Company Limited, a British company
Filed Nov. 20, 1958, Ser. No. 775,319
3 Claims. (Cl. 62—54)

This invention relates to a storage tank for liquid oxygen or other gaseous oxidant in a liquefied state at low temperature (hereafter referred to as "liquid") in a rocket, and has for its object to provide a tank in which boiling of the liquid is suppressed during its consumption throughout the flight of the rocket.

At the commencement of the powered flight of a rocket there is a considerable influx of heat from the surroundings to the storage tank containing the liquid, and in the case of liquid oxygen which is at a low temperature of the order of −183° C. some of the liquid will evaporate unless steps are taken to prevent boiling. Boiling is detrimental, and leads to an undesirable residue of cold dense gas in the tank at the end of the powered flight.

Boiling can be suppressed for a short period by pressurising the tank at the commencement of powered flight, but the complete suppression of boiling by pressurisation is impractical and would still leave a dense residue of gas in the tank. Similarly, thermal insulation of the tank is impractical in the interests of weight economy.

According to the present invention, an outlet for the liquid is located in the base of the tank and an internal baffle system is provided which functions to cause liquid to be drawn off from the tank through said outlet from the vicinity of the walls of the tank, whereby the liquid most recently subjected to the influx of heat through the tank walls is drawn off first and there is suppression of boiling of the liquid during powered flight.

The baffle system may comprise an assembly consisting of perforated side walls and an imperforate base, the assembly being mounted in closely spaced relation to the corresponding walls of the tank.

Embodiments of the invention will now be described with reference to the accompanying drawings, in which:

FIG. 1 is a diagrammatic sectional side elevation of a tank constructed according to the present invention, together with diagrammatic representations of parts of a typical rocket installation.

FIG. 2 is a side elevation, partly in section, of a baffle assembly for a rocket storage tank, said assembly being a modification of the baffle assembly shown in FIG. 1.

Referring to FIG. 1 of the drawings, a cylindrical upright rocket storage tank 10 has a bottom outlet 11 which is connected by a conduit 12 to the inlet of a pump 13, the pump feeding a rocket motor (not shown) via a feed conduit 14.

A branch conduit 15 leading from the feed conduit 14 extends back to the top of the storage tank 10 via a flow control valve 16 and an evaporator/superheater 17. The apparatus so far described is typical of a rocket installation, but in accordance with the present invention a baffle system comprising an assembly of a perforated cylindrical side wall 18 and an imperforate base 19 is mounted within the tank 10 by means of struts 20 so that the baffle assembly is in closely spaced relation to the side wall and base of the tank 10. The side wall 18 of the baffle assembly extends over at least half the height of the liquid storage space in the tank 10, and it will be seen that when liquid is drawn off through the outlet 11 in the tank base, the flow pattern within the tank comprises radially outwardly flowing streams, indicated by arrows in FIG. 1, through the orifices 21 in the baffle side wall 18 into the annular space between the baffle assembly and the tank wall, and a downward flow within said space towards the outlet 11. Therefore the liquid in the vicinity of the side and base walls of the tank 10 is drawn off to the outlet 11, and this liquid is that most recently subjected to heat inleak through the tank walls. The baffle assembly shown in FIG. 2 comprises a perforated cylindrical side wall 22, an imperforate base 23 and support struts 24, as in FIG. 1, but the perforations 25 in the side wall 22 decrease in size from top to bottom of the baffle side wall 22, i.e. the perforations decrease in size the nearer they are to the imperforate base 23, the object being to encourage draw-off from the top of the tank when the later is full.

With this arrangement the result is that the heat which leaks into the tank 10 from the surroundings is continuously removed as liquid is removed from the annular space between the baffle assembly and the tank walls, and the liquid drawn off is replaced by the colder liquid from the central region of the tank 10. If, as is usual, the tank is slightly pressurised at the instant of firing the rocket, the present invention suppresses boiling throughout the duration of powered flight, and if heated gas (say 100° C.) from the superheater 17 is admitted to the vapor space of the tank 10 during the period when liquid is being discharged from the tank, the tank 10 will contain relatively hot low density gas at the end of the discharge period. The valve 16 is opened to allow liquid gas to reach the evaporator/superheater 17 via branch conduit 15 during flight.

The baffle assembly is subjected to practically no stresses, so it can be made as light in weight as possible to minimise any weight disadvantage due to its inclusion.

What I claim is:

1. Apparatus for storing a body of low-temperature liquefied gas for uninterrupted draw-off of the whole of said body of liquefied gas with suppression of boiling during draw-off, comprising the combination of a liquid gas storage tank having top, side and base walls, a draw-off conduit connected to an outlet port located substantially centrally of said base wall, a baffle assembly extending over at least half the height of the storage tank and comprising an imperforate base wall and side walls having perforations throughout their height, and support means locating said baffle assembly within said tank with the base and side walls of the baffle assembly in closely spaced relation to the base and side walls of the tank, said baffle assembly being operative to constrain substantially the whole of the draw-off flow of liquefied gas from said body to said outlet port to be confined to the vicinity of the walls of the tank for continuous removal with the liquefied gas of heat entering thereto via the walls of the tank.

2. Apparatus according to claim 1, wherein the perforations in the side walls of the baffle assembly decrease in size the nearer they are to the imperforate base so that the baffle assembly is operative to encourage draw-off from the top of the tank when the latter is full of liquefied gas.

3. Apparatus for storing a body of low-temperature liquefied gas for uninterrupted draw-off of the whole of said body of liquefied gas with suppression of boiling during draw-off, and with a residue of low density vaporised gas at the end of the draw-off period, comprising the combination of a liquid gas storage tank having top, side and base walls, a draw-off conduit connected to an outlet port located substantially centrally of said base wall, a baffle assembly extending over at least half the height of the storage tank and comprising an imperforate base wall and side walls having perforations throughout their height, support means locating said baffle assembly within said tank with the base and side walls of the baffle assembly in closely spaced relation to the base and side walls of the tank, and with the baffle assembly operative to constrain substantially the whole of the draw-off flow of liquefied gas from said body to said outlet port to be confined to the vicinity of the walls of the tank for continuous removal with the liquefied gas of heat entering thereto via the walls of the tank, a branch conduit extending from said draw-off conduit to the top of storage tank, and a superheater in said branch conduit operative to establish a supply of vaporised gas to the vapor space of the tank during draw-off.

References Cited in the file of this patent

UNITED STATES PATENTS

| | | |
|---|---|---|
| 1,080,547 | Gamble | Dec. 9, 1913 |
| 2,217,467 | Bonnaud | Oct. 8, 1940 |
| 2,320,913 | Crowell | June 1, 1943 |
| 2,397,658 | Goddard | Apr. 2, 1946 |
| 2,610,471 | Thayer | Sept. 16, 1952 |
| 2,760,335 | Goddard | Aug. 28, 1956 |

FOREIGN PATENTS

| | | |
|---|---|---|
| 669,099 | Great Britain | Mar. 26, 1952 |